C. W. Saladee,
Snap Hook,
№ 50,167.   Patented Sept. 26, 1865.
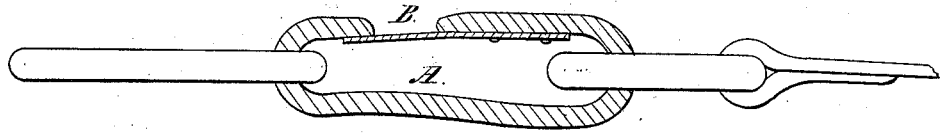
Witnesses:
O. E. Clayton
W. K. Smood
Inventor:
Cyrus W. Saladee,
by Atty.
J. E. Clayton

UNITED STATES PATENT OFFICE.

CYRUS W. SALADEE, OF NEWARK, OHIO.

SNAP-LINK.

Specification forming part of Letters Patent No. 50,167, dated September 26, 1865.

*To all whom it may concern:*

Be it known that I, CYRUS W. SALADEE, of Newark, Licking county, in the State of Ohio, have invented a new and useful Snap-Link, to be used for coupling parts of harness and other like purposes; and I do hereby declare that the following is a full and exact description thereof, reference being had to the accompanying drawing, making a part of this specification, and to the letters of reference thereon marked.

The nature of my invention consists simply in forming an open link of any desired form and providing it with a spring, so as to form a wrought-iron snap-link suitable for connecting parts of harness or of mending chains, &c.

In the drawing, A is the open link, formed of a single piece of wrought-iron bent into the desired form, and having the opening for the insertion of the ring at or near the middle of one side of the link, so that there shall be a hook at each end of the link suitable to receive the ring of a bridle or other strap.

B is a flat steel spring riveted to one of the ends of the open link A, and springing up against the under surface of the other end of the link, in such a manner as to form a snap-link or snap-hook.

Most devices heretofore made for use as snap-hooks have been made out of cast or malleable iron, and for that reason are more liable to break under hard usage or severe strain than if they were made of wrought-iron.

The construction of my snap-link is such that it is most easily made of wrought-iron or other wrought metal. It is therefore less liable to break by blows or hard pulling than those that are cast.

I do not confine my claim to the precise arrangement of link and spring shown in the drawing, as it is capable of application to various uses (such as coupling any two distinct parts of harness, mending chains, attaching traces to whiffletrees, &c.) to which the common single snap-hook is not applicable.

Having thus fully described my invention, what I claim as new, and desire to secure by Letters Patent, is—

The spring B, or its equivalent, in combination with the open link A, in the manner and for the purpose substantially as shown and described.

In testimony that I claim the above, I have hereunto set my hand this 16th day of August, 1865.

CYRUS W. SALADEE.

Witnesses:
E. A. SALADEE,
JOHN MURRAY.